(12) United States Patent
Austin

(10) Patent No.: US 7,842,252 B2
(45) Date of Patent: Nov. 30, 2010

(54) REACTION VESSEL INCLUDING FIELDING APPARATUS

(75) Inventor: Gary N. Austin, Stillwater, OK (US)

(73) Assignee: Coastal Hydrogen Energy, Inc., Stillwater, OK (US)

( * ) Notice: Subject to any disclaimer, the term of this patent is extended or adjusted under 35 U.S.C. 154(b) by 787 days.

(21) Appl. No.: 11/680,335

(22) Filed: Feb. 28, 2007

(65) Prior Publication Data

US 2007/0183942 A1 Aug. 9, 2007

Related U.S. Application Data

(63) Continuation-in-part of application No. 11/046,081, filed on Jan. 28, 2005, now Pat. No. 7,601,308, which is a continuation-in-part of application No. 10/488,779, filed on Sep. 24, 2004, now abandoned, which is a continuation-in-part of application No. 10/065,429, filed on Oct. 16, 2002, now Pat. No. 6,669,827, which is a continuation-in-part of application No. 09/883,169, filed on Jun. 18, 2001, now abandoned.

(60) Provisional application No. 60/544,907, filed on Feb. 13, 2004.

(51) Int. Cl.
*B01J 19/08* (2006.01)
*H01J 49/30* (2006.01)

(52) U.S. Cl. .............................. 422/186.3; 422/186.01; 422/186.29; 250/298

(58) Field of Classification Search .............. 422/186.3, 422/186.01, 186.29; 250/298
See application file for complete search history.

(56) References Cited

U.S. PATENT DOCUMENTS

| 4,095,118 A | 6/1978 | Rathbub |
| 5,418,431 A | 5/1995 | Williamson et al. |
| 5,805,972 A * | 9/1998 | Miyamoto et al. ..... 422/186.03 |
| 6,768,109 B1 * | 7/2004 | Brokaw et al. .............. 250/298 |
| 2005/0042150 A1 | 2/2005 | Griffin |

OTHER PUBLICATIONS

Hideki Kato, Kiyotaka Asakura, and Akhiki Kudo, Mechanism Of Highly Effective Water Splitting On NiO-Loaded NaTaO₃ Photocatalysts Doped With Lanthanum Ions, Publisher: Science University of Tokyo, Published in: Japan.

* cited by examiner

*Primary Examiner*—Kishor Mayekar
(74) *Attorney, Agent, or Firm*—Fellers, Snider, Blankenship, Bailey & Tippens, P.C.

(57) ABSTRACT

The present disclosure provides a system and method to dissociate water molecules into $H_2$ and $O_2$ and includes a reaction vessel having at least one radiolysis apparatus, at least one photolysis apparatus, at least one catalyst apparatus, and at least one electromagnetic fielding apparatus. The reaction vessel has a body, a first end and a second end defining an interior reaction chamber, an inlet for receiving water vapor and at least two outlets. A plurality of windings of a contiguous electrical conductor are wound in a first direction adjacent the first outlet and plurality of windings of a contiguous electrical conductor wound in a second direction adjacent the second outlet such that the first direction is opposite the second direction. When a current is applied to the conductor, an electromagnetic field is generated to migrate the disassociated $H_2$ and $O_2$ molecules toward the respective first outlet or second outlet.

21 Claims, 6 Drawing Sheets

REACTION VESSEL INCLUDING FIELDING APPARATUS

FIELD OF THE INVENTION

This invention relates generally to a reaction vessel for molecular dissociation processes, and specifically to a reaction vessel for the ultra fast dissociation of water molecules.

BACKGROUND OF THE INVENTION

In the prior art, disassociation of the water molecule $H_2O$ is accomplished by most commonly electrolysis or photolysis. In an electrolysis process, known methods for migration of disassociated molecules from the reaction vessel to their respective storage tanks are accomplished through cathode/anode attraction. Water molecules are typically disassociated in an electrolyte bath wherein the respective hydrogen oxygen ions are attracted to the cathode or anode. The respective ions leave the respective electrode and the respective gases become diatomic in their neutral state. The disassociated hydrogen and oxygen molecules are migrated from the reaction vessel adjacent the respective cathode (hydrogen) and anode (oxygen) and are immediately collected in a respective separate header which then directs the molecules for aggregation and storage. Electrolysis processes require a minimum of 5 eV of electrical energy in order to dissociate an $H_2O$ molecule in a neutral pH aqueous environment. A need exists for a more energy efficient method and apparatus to accomplish dissociation.

In an electrolysis process, separation and aggregation of the respective hydrogen and oxygen molecules is accomplished since the electrodes affect the disassociation of the water molecules. Migration of the respective molecules to the cathode or anode results in separation of the disassociated hydrogen and oxygen molecules thereby making aggregation possible.

In photo association systems, light energy causes the water molecules to split. The disassociated hydrogen and oxygen molecules do not migrate as in a electrolysis process. With regard to photo-disassociation systems, the respective disassociated hydrogen and oxygen gases are thus not influenced for specific molecular migration. As a result, the disassociated gases will exit the reaction vessel together and are thereby prone to recombination at or about the exit port(s). A need, therefore, exists for a reaction vessel which effectively addresses disassociation and respective oxygen and hydrogen gas migration for the purpose of separation and aggregation.

Photo-dissociation of the water molecule $H_2O$ has been shown in the prior art using various approaches including catalysts, ultraviolet light, laser light sources, superheated steam and solar pumped lasers. Also described are systems employing photo-chemical diodes, photo-voltaics, and various vessel configurations. Problems involved in these prior art systems have included volatility of hydrogen when obtained from superheated steam, excessive costs in systems using specialized light sources, material and maintenance costs of systems employing catalysts, and the lack of gas purity in the gas separation process.

Additionally, the prior art attempts to obtain hydrogen from water has been stifled by the cost associated with such endeavors. The prohibitive cost is caused by various factors, including the process reaction mechanisms have been inefficient and the resultant methods did not account for the proper utilization of the necessary oxygen in the reaction processes.

What is therefore needed are systems and methods to obtain hydrogen from water which provides lower gas volatility, higher gas purity, with lower equipment and maintenance costs.

SUMMARY OF THE INVENTION

The present invention provides systems and methods for the ultra fast dissociation of the water molecule at relatively low temperatures, and at higher purity. The present invention further provides for the use of lower cost, ultra-violet, light sources that can be used to dissociate the water molecule, and radiolysis techniques which can be used to further increase dissociation efficiency and gas purity.

In one aspect of the present disclosure, an ultra fast photodissociation system is presented comprising a water vaporizer and a reaction vessel. The water vaporizer is connected in fluid communication with a water supply. The water vaporizer is connected in fluid communication with the water supply to receive water, preferably purified water. The reaction vessel is connected in steam communication with the water vaporizer to receive the water vapor and is operable to dissociate the water vapor into $H_2$ and $O_2$ gas. In other aspects of the invention, multiple reaction vessels may be connected, in parallel to the water vaporizer.

In another embodiment of the present disclosure, the ultra fast photodissociation system is presented to include a water acidifier, a water vaporizer, and a reaction vessel. The water acidifier is connected in fluid communication with a water supply, preferably purified water, and is operable to acidify the supplied water to produce acidic water. It is understood, however, that while the water acidifier provides advantages to the chemical reaction, it is not necessary for the dissociation process and apparatus of the present disclosure. The water vaporizer is connected in fluid communication with the water acidifier to receive the acidic water and is configured to convert the received acidic water into acidic water vapor. The reaction vessel is connected in steam communication with the water vaporizer to receive the acidic water vapor, and is operable to dissociate the (acidic) water vapor into $H_2$ and $O_2$ gas as described above.

In other embodiments, the reaction vessel could be configured so as to receive the water, which may also be acidic, in a liquid or vapor state. However, in order to receive the water in the liquid state and also employ a photo-catalyst, the reaction vessel would be configured to include a matrix to contain the photo-catalyst so that the photo-catalyst is not washed out of the matrix. In such an embodiment, the ultra fast dissociation may be accomplished in a batch process where a volume of water (preferably purified) is supplied to the reaction vessel for dissociation.

In a second aspect of the invention, the reaction vessel of the present disclosure is operable to dissociate water molecules into $H_2$ and $O_2$ gas. The reaction vessel includes an inlet configured to receive water molecules (water vapor or acidic water vapor), an $H_2$ outlet configured to output $H_2$ gas, and an $O_2$ outlet configured to output $O_2$ gas. The reaction vessel may also have an optically reflective coating disposed on the interior or exterior vessel wall. The deposited optically reflective coating operates to reflect light back within the interior region of the reaction vessel, and to effectively reduce the wavelength of the light reflected therefrom. The reaction vessel may further include a catalyst (or photo-catalyst) which may be contained in a media supported within the reaction vessel. The interior of the reaction vessel may also be coated with photo-catalyst. These photo-catalysts operate to induce a catalytic reaction in the molecular dissociation of the water molecules.

Using the reaction vessel in the process of the present disclosure, acceptable photo-catalysts are selected to have a characteristic band gap of less than 5 eV. The selected photo-catalysts are photon responsive to effectuate excitation of the electrons in the photo-catalyst from the valence band to the conduction band within the stated 5 eV energy input threshold. In the conduction band, the electrons become active. The acceptable photo-catalyst is significantly also chosen in association with a selected source of photon emissions (light source) so as to mate the spectrum of photon emission from the light source with the wavelength at which the photo-catalyst becomes photo-catalytic. The selected acceptable photo-catalyst must also be photo-catalytic at a wavelength which is able to dissociate $H_2O$ molecules, above 250 nm.

When the selected light source (photon emitter) is directed at the reaction vessel of the present disclosure containing the selected acceptable photo-catalyst, the electrons of the photo-catalyst are excited to the conduction band and become active as described above. This occurs at a wavelength which includes the wavelength sufficient to dissociate the $H_2O$ molecule, 250 nm. Water is then introduced into the reaction vessel from the water vaporizer in the vapor phase. In this state, the photo-catalyst is conductive to the water vapor. When the $H_2O$ molecules in the vapor phase are introduced to the reaction vessel they are, likewise, subject to the photon energy emitted from the light source entering the reaction vessel through the vessel wall. The electrons in the $H_2O$ molecules become active such that the $H_2O$ molecules exchange electrons with the photo-catalyst. The bond strengths holding the $H_2O$ molecules together become diminished and the molecules no longer have the energy to remain bonded together. The hydrogen and oxygen molecules no longer share electrons and the bonds are subsequently broken. The hydrogen and oxygen molecules are thus dissociated from one another with the oxygen molecules gaining electrons donated by the hydrogen molecules. The dissociated hydrogen and oxygen gases then become ionized and diatomic. An exemplary process for the ultra fast dissociation of water molecules is disclosed in U.S. Pat. Nos. 6,669,827 and 7,125,480, incorporated herein by reference.

It is known that once dissociated, $H_2$ and $O_2$, if left together in the same vessel, will almost immediately recombine. The reaction vessel in the present disclosure includes a radiolysis apparatus wherein the dissociated $H_2^+$ and $O_2^-$ molecules are subject to RF frequency ionizing radiation thereby forming an $H_2^+$ and $O_2^-$ plasma within the reaction vessel. This ionizing radiation retains the $H_2^+$ and $O_2^-$ molecules dissociated resulting in higher conversion efficiency, an object of the present disclosure. An electromagnetic fielding apparatus of the present disclosure causes the $H_2^+$ and $O_2^-$ ions to migrate where they are separated and aggregated.

In yet another aspect of the present disclosure, it is an object to provide the reaction vessel to include an electromagnetic fielding apparatus in order to migrate ions released in the reaction chamber, such as $H_2^+$ and $O_2^-$ ions in a water dissociation process. The reaction vessel includes a body with two ends, a first end and a second end with an inlet port at one end (the first end) for the ingress of the reactant (water), a reaction chamber, and at least two outlet ports, a first outlet and a second outlet, at the other end (the second end) for the resultant gases (hydrogen gas and oxygen gas) to exit the vessel. The reaction vessel is configured to provide electromagnetic fielding to the reaction chamber and the vessel second end to effect cathode/anode migration for the respective gases (oxygen and hydrogen) to exit the vessel through the outlet ports at the second end.

The system and method of the present disclosure includes a reaction vessel for the ultra fast dissociation of water molecules having at least one radiolysis apparatus, at least one photolysis apparatus, at least one catalyst/photo-catalyst apparatus, and an electromagnetic fielding apparatus. The reaction vessel includes, generally, a vessel body having an inlet at its first end, a reaction chamber; and a first outlet and a second outlet adjacent its second end. The photolysis apparatus includes a light source which emits photon energy into the reaction chamber of the reaction vessel. The light source may be integrated into the reaction vessel or positioned adjacent the reaction vessel so as to emit photon energy through the wall of the vessel. The reaction vessel includes a catalyst coated matrix disposed in the reaction chamber. In other embodiments, multiple reaction vessels may be positioned adjacent the light source such that photon energy may be emitted into multiple reaction vessels from a single source. The radiolysis apparatus includes at least one wave guide emitter positioned to emit RF frequency ionizing radiation into the reaction chamber of the reaction vessel.

The electromagnetic fielding apparatus includes a contiguous electrical conductor wound to generate a positive magnetic field adjacent one (or the first) outlet for attracting negatively charged ions produced within said reaction chamber and a negative magnetic field adjacent the other (or the second) outlet for attracting positively charged ions produced within the reaction chamber.

In a reaction vessel for the dissociation of $H_2O$ molecules, this positive magnetic field attracts the negatively charged dissociated $O_2^-$ ions toward and out of the first outlet for collection and aggregation. Likewise, a plurality of windings of the contiguous electrical conductor wound in a second direction adjacent the second outlet produces a negative magnetic field which attracts the positively charged dissociated $H_2^+$ ions toward and out of the second outlet for collection and aggregation. The contiguous electrical conductor wound in the first direction is opposite the windings in the second direction. The end of the contiguous electrical conductor wound in the first direction is in electrical communication with the positive pole of a power source while the end of the contiguous electrical conductor wound in the second direction is in electrical communication with the negative pole of the power source. A current applied to the electrical conductor generates the magnetic fielding adjacent the second end of the reaction vessel so as to cause the $H_2^+$ and $O_2^-$ ions to migrate toward the respective first outlet or second outlet. It is understood that the terms first outlet and second outlet and first direction and second direction as used in the present disclosure are for description and clarity only and could be used interchangeably in relation to the magnetic fielding. It is also understood that either the first outlet or the second outlet could be configured so as to generate a positive or negative magnetic field as may be desired or required without departing from the spirit and scope of the present disclosure.

In yet another aspect of the present invention, a system utilizes the captive dissociated hydrogen and oxygen molecules as set out above to enhance the operation of a solid oxide fuel cell is disclosed. One application of this aspect involves the generation of potable water and hydrogen fuel from salt water through hybrid distillation/reverse osmosis (RO) utilizing the solid oxide fuel cell as a heat and electric power source. Other advantages and aspects of the invention will be obtained from the following drawings and detailed description.

DESCRIPTION OF THE PREFERRED EMBODIMENTS

Before explaining the present invention in detail, it is important to understand that the invention is not limited in its application to the details of the embodiments and steps described herein. The invention is capable of other embodiments and of being practiced or carried out in a variety of ways. It is to be understood that the phraseology and terminology employed herein is for the purpose of description and not of limitation.

The energy required to dissociate the water molecule has previously been cost prohibitive to obtain hydrogen as a fuel, as the energy required to produce the $H_2$ fuel has been greater than the energy provided by the $H_2$ fuel produced. The present invention now describes a system which utilizes molecular water in a controlled state, specifically water vapor in one embodiment and acidic water vapor in a second embodiment, to more efficiently produce $H_2$ fuel.

Previous drawbacks of photo-dissociation systems have included the almost immediate recombination of the $H_2$ and $O_2$ constituents. The present disclosure employs a radiolysis approach in which the $H_2$ and $O_2$ constituents are bombarded with RF frequency ionizing radiation to inhibit their recombination. The frequency ionizing radiation maintains the dissociated components in an ion plasma environment. The use of RF frequency ionizing radiation thereby results in higher conversion efficiency of the system.

An additional drawback has been the difficulty in separating, collecting, and aggregating the constituent dissociated hydrogen and oxygen gases. The present disclosure employs an electromagnetic fielding approach in combination with the RF radiation in order to migrate the respective charged ions toward separate outlets for collection and aggregation.

I. Photo-dissociation Methodology and Exemplary System

Figure 1B:
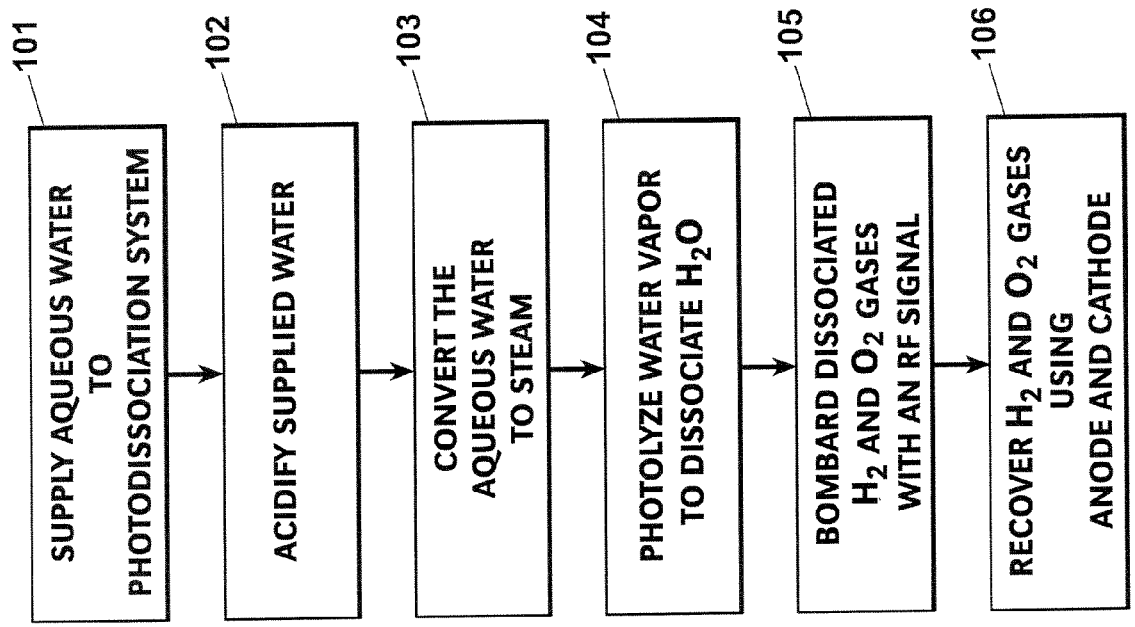
FIG. 1B shows the method a second embodiment of the method of FIG. 1A to include acidic water vapor employing ultra fast dissociation of water molecules in accordance with the present disclosure.
Figure 1A:
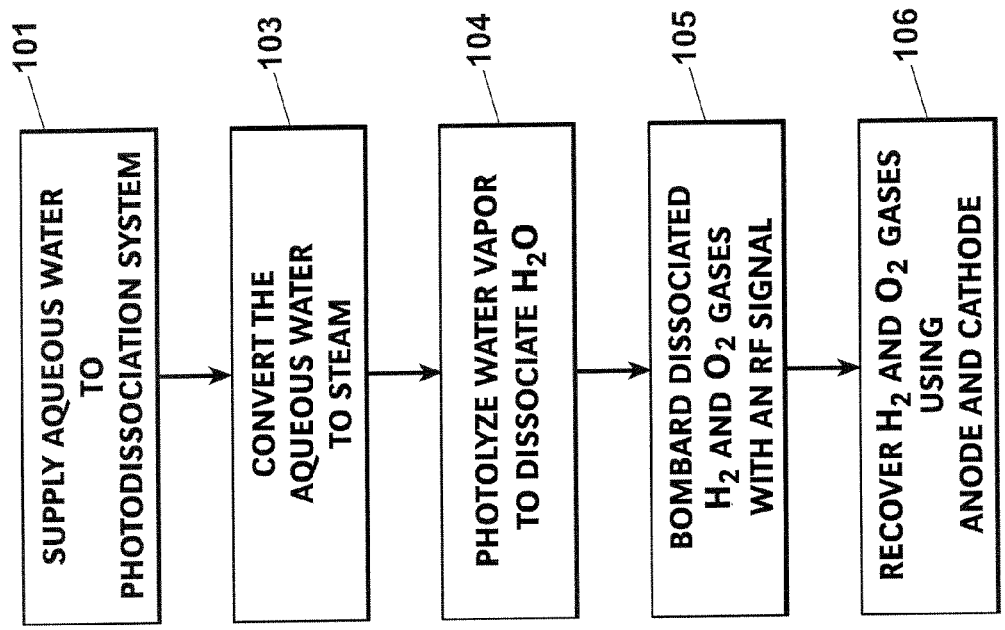
FIG. 1A shows a method employing ultra fast dissociation of water molecules in accordance with the present disclosure.

FIG. 1A illustrates a method for affecting the ultra fast dissociation of a water molecule in accordance with one embodiment of the present invention. Initially at 101, aqueous water is supplied to a dissociation system, an embodiment of which is shown and described in FIG. 1B below. The supplied water may be from any source, such as a well, a lake, or an ocean.

Subsequently at 103, the water is heated and converted into water vapor, most preferably between the temperatures of 120° and 210° C. Producing water vapor at this relatively low temperature provides advantages, as the $H_2$ gas is much more stable, and subsequent processing equipment operates at reduced temperatures, lowering their cost and extending their life cycles. At 104, the water vapor is dissociated into constituent $H_2$ and $O_2$ gases. This is accomplished by subjecting the water vapor to photon energy at 104 in a reaction vessel, preferably in the presence of a photo-catalyst. The dissociated hydrogen and oxygen molecules are then bombarded with RF frequency ionizing radiation to inhibit their recombination at 105. Finally, the dissociated $H_2^+$ and $O_2^-$ ions are subjected to an electromagnetic field which migrates the respective charged ions for collection and aggregation at 106, the process of which and a reaction vessel for which is further described below.

In a second embodiment, FIG. 1B, the supplied water is acidified at 102, preferably prior to being converted into water vapor at 103 and continue as described above. The acidification process may include using a reverse osmosis process, or a similar technique to lower the water's pH. The water's pH may be reduced to within a range of 1.5 to 6.9, more preferably within a range of 3.0 to 5.5, and even more preferably within a range of 4.0 to 5.0. In the instance in which the supplied water is already acidic, this process step may not be required, or the process may be scaled back to derive the acidity level desired. In a second embodiment wherein acidic water is employed, the acidic water includes the proton acid $H_3O^+$ and is vaporized to produce the dihydronium molecule $H_5O_2$. The dihydronium molecule $H_5O_2$ requires much less energy to split compared to $H_2O$, as the dihydronium molecule presents a much larger target for photo-dissociation, and its bonds lengths are stretched in its vapor phase state.

Figure 6:
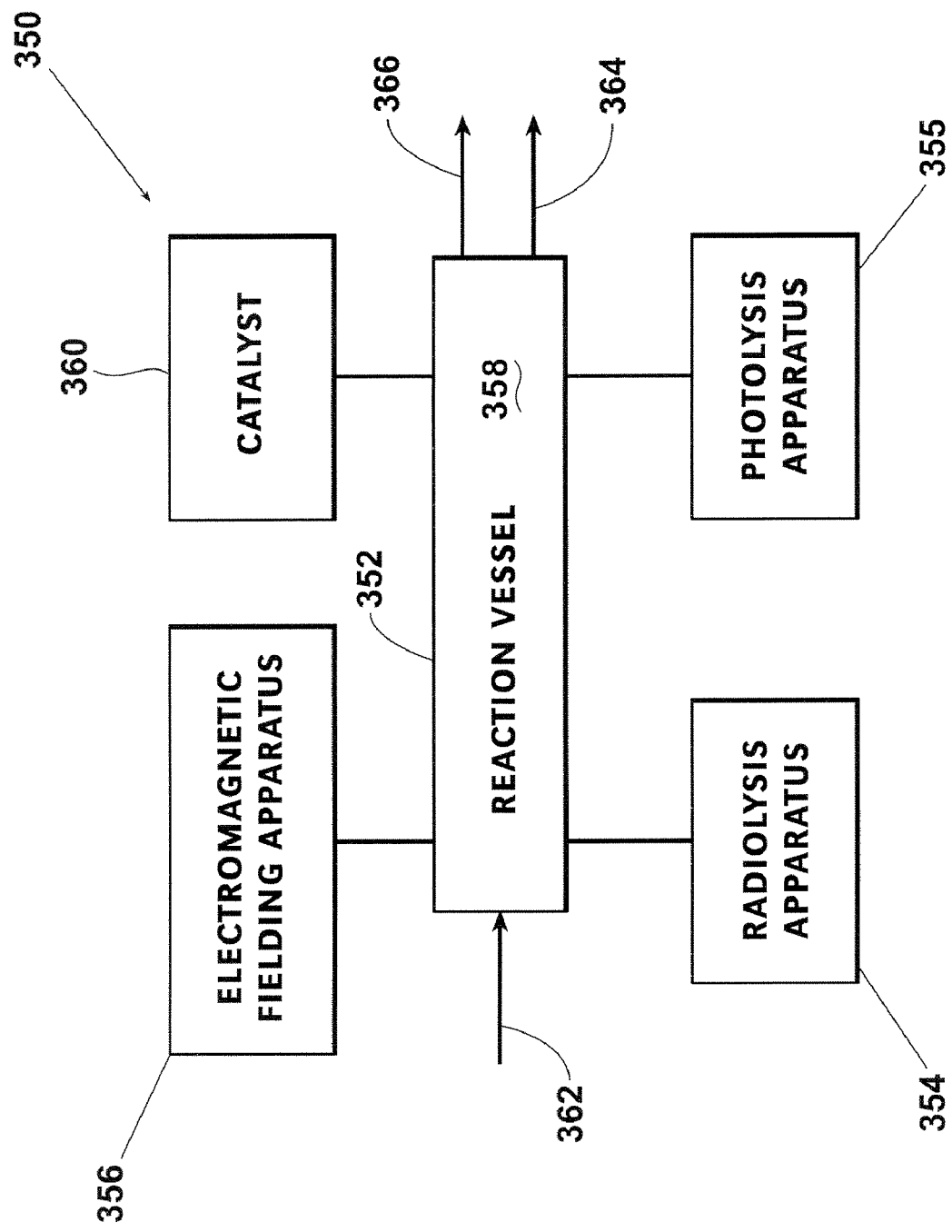
FIG. 6 shows an embodiment of a simplified block diagram of a dissociation system employing the dissociation method in accordance with the present disclosure.

FIG. 6 is a simplified block diagram depicting an embodiment 350 of a dissociation system employing the method illustrated in FIGS. 1A and 1B. The exemplary system illustrates a reaction vessel 352 having an inlet 362 for water, an oxygen outlet 364 and a hydrogen outlet 366, at least one radiolysis apparatus 354, such as RF emitter apparatus in communication with reaction vessel 352, at least one photolysis apparatus 355 in communication with reaction vessel 352 to emit light (or photon energy) into vessel 352, at least one electromagnetic fielding apparatus 356 in communication with reaction vessel 352 to effect migration of the respective gases (oxygen and hydrogen) to exit the vessel, and at least one catalyst 360 located within the reaction chamber 358 of reaction vessel 352.

In a preferred embodiment, the interior of reaction vessel 352 includes a catalyst apparatus comprised of a matrix including a catalyst (or photo-catalyst). The matrix is quartz wool which includes a sol gel coating of photo-catalyst thereon. The photo-catalyst could be a transition metal oxide catalyst selected from the group consisting of titanium dioxide, zirconia, nickel, boron, nickel oxides and sodium tantalate along with combinations thereof. Titanium dioxide is a particularly suitable photo-catalyst in the present process such that the sol gel coated quartz wool is cured so as to effectively change the molecular lattice of the titanium dioxide photo-catalyst from amorphous to crystalline (rutile to anatase). Water vapor is then supplied to the reaction chamber 358 of reaction vessel 352 through inlet 362.

Photolysis apparatus 355 emits light radiation (photon energy) into the reaction chamber 358 of reaction vessel 352. This light radiation (photon energy) further excites the water vapor molecules causing their separation into $H_2$ and $O_2$ molecules. One embodiment of the photolysis apparatus 355 comprises at least one mercury vapor lamp which emits ultra violet light into the interior of reaction vessel 352. While the wavelengths of the UV radiation can vary, it has been found that UV radiation having wavelengths between 150 nm and 385 nm is preferred, with wavelengths between of 185 nm and 254 nm being optimal. In order to protect the user from UV radiation exposure, a shroud is employed to reflect the UV light into the interior of the reaction vessel. It is understood that a single mercury vapor lamp and shroud can be utilized in association with more then one reaction vessel simultaneously. The inclusion of a single lamp with a single reaction vessel is merely illustrative and not meant to be limiting.

Radiolysis apparatus 354 emits RF signals into the reaction chamber 358 of reaction vessel 352. The RF signals cause the dissociated hydrogen and oxygen to remain ionized so as to be affected for migration by electromagnetic fielding apparatus 356 for separation, aggregation and storage. Embodiments of the radiolysis apparatus 354 can include one or more RF ports configured to receive one or more RF horns coupled to an RF signal generator in order to direct RF frequency ionizing radiation into the reaction chamber 358 of reaction vessel 352. The RF signals can be emitted between 5 and 96 GHz. Moreover, the frequency of the RF signal can be set to substantially match the resonant frequency of the vapor phase water molecules. In another embodiment, the radiolysis apparatus can include a variable voltage controlled oscillator and a wireless RF waveguide emitter in communication with the outer surface of reaction vessel 352.

Electromagnetic fielding apparatus 356 includes a contiguous electrical conductor wound to generate a positive magnetic field adjacent one (or first) outlet 364 for attracting negatively charged ions produced within said reaction chamber and a negative magnetic field adjacent the other (or second) outlet 366 for attracting positively charged ions produced within the reaction chamber. A plurality of windings of the contiguous electrical conductor wound in a first direction adjacent the first outlet 364 generates the positive magnetic field adjacent the first outlet in order to migrate $O_2^-$ ions toward and out through first outlet 364 for aggregation and storage. A plurality of windings of the contiguous electrical conductor wound in a second direction (opposite the first direction) adjacent second outlet 366 generates the negative magnetic field adjacent the second outlet in order to migrate $H_2^+$ ions toward and out through second outlet 366 for aggregation and storage.

II. Reaction Vessel

Figure 2:
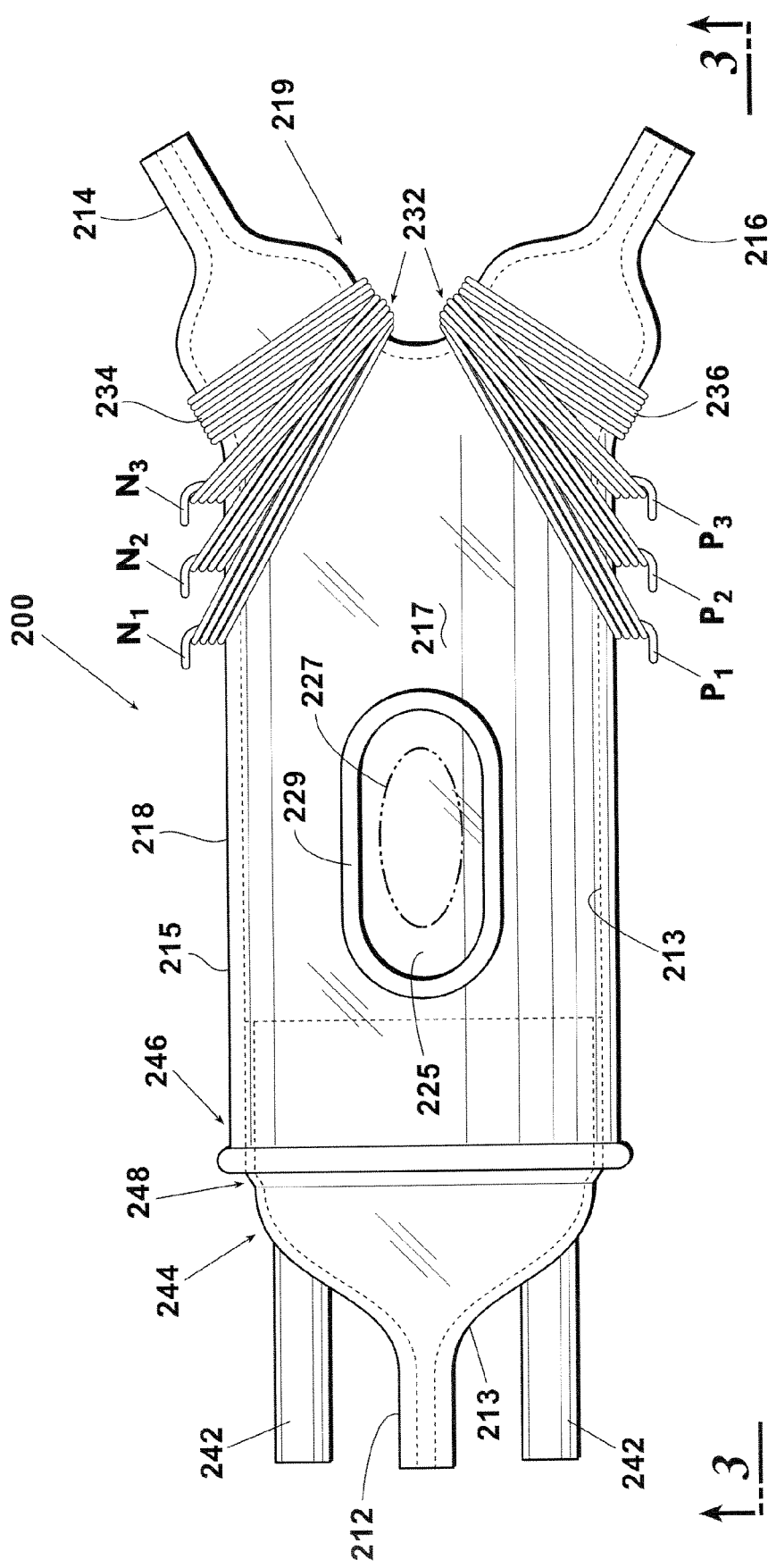
FIG. 2 is a side view of the reaction vessel of the present disclosure.
Figure 3:
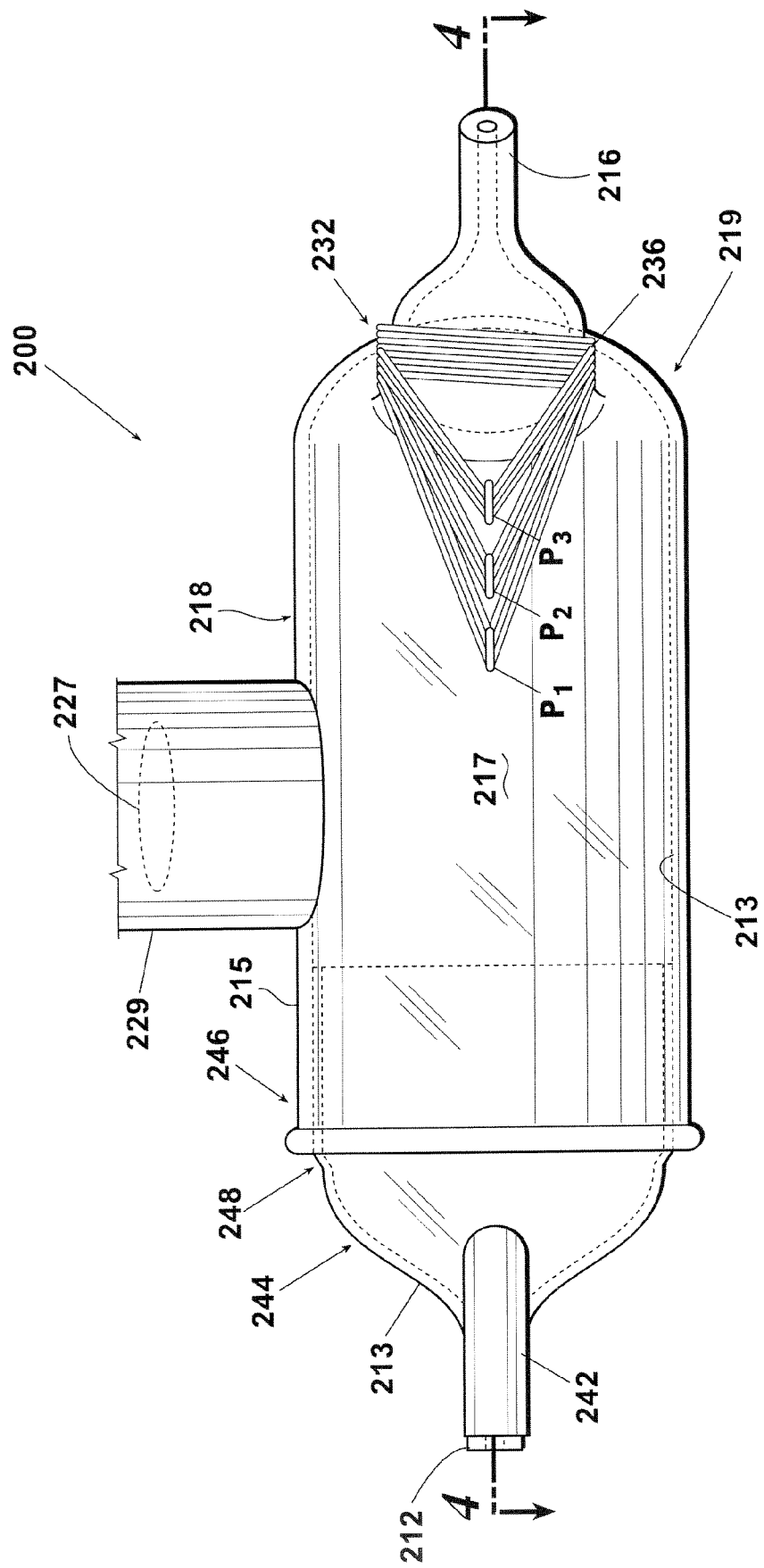
FIG. 3 is view taken along line 3-3 of FIG. 2.
Figure 4:
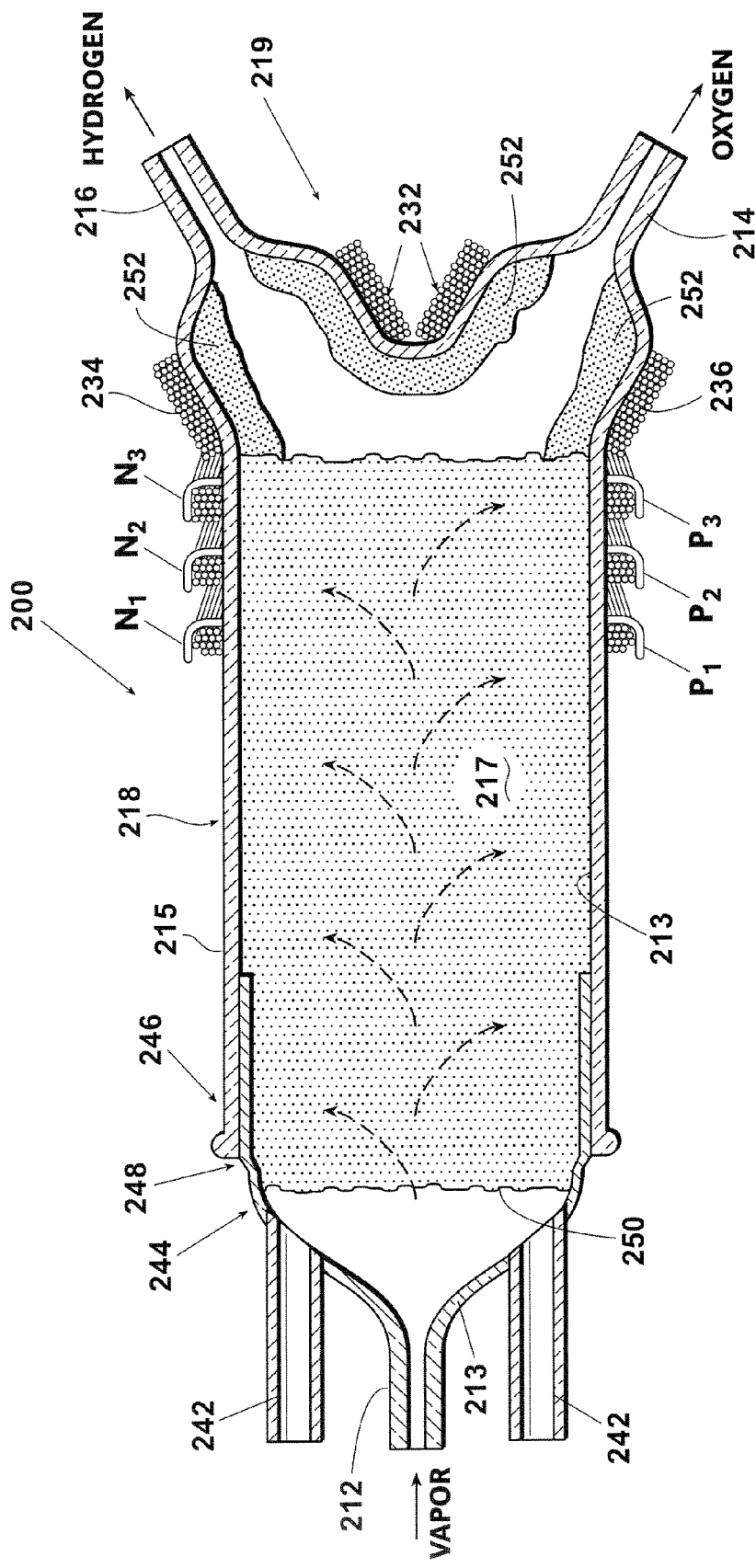
FIG. 4 is a view taken along line 4-4 of FIG. 3 and is a cut-away view of the reaction vessel of the present disclosure.

The reaction vessel of the present disclosure is operable to dissociate $H_2$ and $O_2$ from the water vapor molecules contained therein. FIGS. 2-4 illustrate a single-stage reaction vessel 200 in accordance with one embodiment of the present disclosure. The reaction vessel 200 includes at least one inlet 212 at a first end 213 configured to receive water molecules in the vapor phase, a reaction chamber 217, a first outlet 214 configured to output $H_2$ gas, and a second outlet 216 configured to output $O_2$ gas. The reaction vessel 200 has an interior region 217 defined by a vessel wall 218 having an inner surface 213 and an outer surface 215. In a specific embodiment, the reaction vessel 200 is generally comprised of an A section 244 and a B section 246. Reaction vessel 200 is assembled with B section 246 configured to receive a portion of A section 244 which extends therein. A ground joint 248 retains A section 244 within B section 246. Reaction vessel 200 is generally cylindrical in shape with a parabolic-shaped first end 213, has a volume of 0.5-3 liters, and is constructed from fused quartz silica, although it is understood that vessels of other shapes, volumes, and composition may be used in alternative embodiments. In the preferred embodiment, inlet 212 is in steam communication with a water vaporizer and configured to receive water vapor, although in an alternative embodiment, liquid phase water may be supplied to reaction chamber 217 or into a vapor within an initial chamber of the reaction vessel. In such alternate embodiments, the inlet 212 is configured to receive liquid phase water.

Reaction vessel 200 further includes a photolysis apparatus which emits photon energy into the reaction chamber 217. One or more light ports 225 located on or near the wall's outer surface 215 are operable to guide photon emissions from a photon emitter (light source) 227 of a predefined wavelength(s) there through and into the reaction chamber 217. The light ports 225 may connect to a transmission medium, such as a fiber optic cable, or may itself, comprise a photon emitter 227 that generates photon energy to be emitted into reaction chamber 217. In the preferred embodiment, light port 225 comprises a window for photon energy from photon emitter 227 to pass into reaction chamber 217 while a shroud shields the photon emitter in order to prevent photon energy from escaping into the surrounding environment. In the preferred embodiment, photon emitter 227 is a mercury vapor lamp operating at one or more wavelengths between 1500 nm and 185 nm. In order to utilize a mercury vapor lamps reaction vessel 200 is preferably composed of fused quartz silica. In a further preferred embodiment, the aforementioned light source is a laser diode operating in the range of 185 and 900 nm, examples of which are available from Power Technology Incorporated of Little Rock, Ark. Of course, it should be understood that other light sources such as conventionally known lasers (gas, solid state, etc.), light emitting diodes, lamps, and natural sources such as solar radiation may be used alternatively, or in addition to, in alternative embodiments under the present invention.

Reaction vessel 200 may also include an optically reflective coating disposed on the wall's outer surface 215 which is operable to reflect light of one or more wavelengths back into reaction chamber 217. Dissociation efficiency is enhanced by reflecting light within the reaction chamber 217 one or more times, as will be further described below. In the preferred embodiment, the reflective coating is operable to reflect light between 1500 nm and 150 nm, and further preferably between 900 nm and 185 nm. Various materials may be used. In one embodiment, bare aluminum, which may form the vessel wall 218 is used to provide the desired reflectivity. In the preferred embodiment in which the reaction vessel is constructed from fused quartz silica, the reflective coating may consist of a colloidal conductive silver coating. The reflective coating may be patterned around the light port(s) 225 so as to permit injection of the light signal into the reaction chamber 217.

As stated above, a matrix coated with photo-catalyst 250 (FIG. 4) is disposed in reaction chamber 217 of reaction vessel 200. In the preferred embodiment, the matrix is quartz wool which includes a sol gel coating of photo-catalyst thereon and rolled to form a cylindrical geometry of a cross sectional diameter capable of being slid into reaction chamber 217 through the opening in B section 246 before A section 244 is inserted therein. The photo-catalyst is sodium tantalite in the anatase phase in the preferred embodiment. The interior surfaces 213 of the second end 219 of reaction vessel 200 are also coated with photo-catalyst, collectively 252, so as to increase dissociation within reaction chamber 217.

The reaction vessel 200 further includes one or more RF ports, collectively 242, located on or near the wall's outer surface 215, the RF port being configured to electromagnetically couple an RF (radio frequency) signal of predefined frequency(ies) into the reaction chamber 217. In one embodiment, the RF ports 242 are positioned adjacent first end 213 of reaction vessel 200 and are configured to each receive an RF waveguide horn wherein the frequency(ies) of the supplied RF signal is selected to substantially match the absorption frequency(ies) of the water vapor molecule so as to inhibit recombination of the $H_2$ and $O_2$ molecules after dissociation. It should be understood, however that the RF ports 242 could be configured in other embodiments to emit RF frequencies in the middle of reaction vessel 200 or at second end 219. The RF port(s) 242 may comprise any conventional structure operable to launch the desired RF frequency(ies) signal into the interior region 217, such structures including a TEM (transverse electromagnetic) structure such as coaxial cable, or TE (transverse electric) or TM (transverse magnetic) structures, such as a waveguide. Further alternatively, the RF port 242 may itself comprise a RF signal source which produces a signal (or signals) substantially at the desired amplitude and frequency(ies). In a specific embodiment, the RF port 242 comprises a variable oscillator (such as a voltage controlled oscillator) which can be set to output one frequency or a range of frequencies, preferably between 5 GHz and 96 GHz at amplitudes ranging up to 25 watts, and more preferably at 22 and 48 GHz and 0.5 to 5 watts.

The electromagnetic fielding apparatus of the present disclosure includes a contiguous electrical conductor 232 wound to generate a negative magnetic field adjacent one outlet for attracting positively charged ions produced within said reaction chamber and a positive magnetic field adjacent the other outlet for attracting negatively charged ions produced within the reaction chamber. A plurality of windings of contiguous electrical conductor 232 wound in a first direction adjacent first outlet 214 generates the negative electromagnetic field adjacent first outlet 214 to attract and thereby separate the positively charged $H_2^+$ ions dissociated in reaction chamber 217 toward and out of first outlet 214 for collection and aggregation. Likewise, a plurality of windings of contiguous electrical conductor 232 wound in a second direction adjacent second outlet 216 produces a positive electromagnetic field which attracts the negatively charged dissociated $O_2^+$ ions toward and out of second outlet 216 for collection and aggregation. The contiguous electrical conductor 232 wound in the first direction is opposite the windings in the second direction.

In the preferred embodiment, a first end 234 of the contiguous electrical conductor 232 is in electrical communication with the negative pole of a power source (not shown). From the negative pole, first end 234 of the power source the contiguous electrical conductor 232 is wound around first outlet 214 in a first direction. After an initial winding around first outlet 214, first end 234 is wound between first outlet 214 and a position $N_1$ in a poloidal geometry. Position $N_1$ may be any suitable means for retaining or securing the windings of continuous electrical conductor 232 at position $N_1$. In a most preferred embodiment, position $N_1$ is a silica quartz hook molded into the exterior 215 of wall 218 of reaction vessel 200 and positioned approximately 45 cm from first outlet 214 and first end 234 is wound between first outlet 214 and position $N_1$ approximately 14 windings.

After first end 234 of continuous electrical conductor 232 is wound between first outlet 214 and a position $N_1$ continuous electrical conductor 232 is wound between first outlet 214 and a position $N_2$, also in a poloidal geometry. Like position $N_1$, position $N_2$ may be any suitable means for securing the windings of continuous electrical conductor 232 at position $N_2$. In a most preferred embodiment, position $N_2$ is a silica quartz hook molded into the exterior 215 of wall 218 of reaction vessel 200 and positioned approximately 30 cm from first outlet 214 wherein continuous electrical conductor 232 is wound between first outlet 214 and position $N_2$ approximately 17 windings.

After continuous electrical conductor 232 is wound between first outlet 214 and a position $N_2$ continuous electrical conductor 232 is wound between first outlet 214 and a position $N_3$, also in a poloidal geometry. Like position $N_2$, position $N_3$ may be any suitable means for securing the windings of continuous electrical conductor 232 at position $N_3$. In a most preferred embodiment, position $N_3$ is a silica quartz hook molded into the exterior 215 of wall 218 of reaction vessel 200 and positioned approximately 15 cm from first outlet 214 wherein continuous electrical conductor 232 is wound between first outlet 214 and position $N_3$ approximately 20 windings. After continuous electrical conductor 232 is wound between first outlet 214 and a position $N_3$, continuous electrical conductor 232 is wound around first outlet 214 in a torroidal geometry. It is most preferred that first end 234 is wound around first outlet 214 approximately 80 windings.

After continuous electrical conductor 232 is wound around first outlet 214, continuous electrical conductor 232 is crossed over to second outlet 216 where it is wound around second outlet 216 in an initial winding (or several initial windings) in a second direction. It is important to note that the second direction is opposite the first direction. After the initial winding(s), contiguous electrical conductor 232 is wound between second outlet 216 and a position $P_1$ in a poloidal geometry. Position $P_1$ may be any suitable means for securing the windings of continuous electrical conductor 232 at position $P_1$. In a most preferred embodiment, position $P_1$ is a silica quartz hook molded into the exterior 215 of wall 218 of reaction vessel 200 and positioned 45 cm from second outlet 216 and contiguous electrical conductor 232 is wound between second outlet 216 and position $P_1$ 14 windings.

After continuous electrical conductor 232 is wound between second outlet 216 and a position $P_1$, continuous electrical conductor 232 is wound between second outlet 216 and a position $P_2$, also in a poloidal geometry. Like position $P_1$, position $P_2$ may be any suitable means for securing the windings of continuous electrical conductor 232 at position $P_2$. In a most preferred embodiment, position $P_2$ is a silica quartz hook molded into the exterior 215 of wall 218 of reaction vessel 200 and positioned 30cm from second outlet 216 wherein continuous electrical conductor 232 is wound between second outlet 216 and position $P_2$ approximately 16 windings.

After continuous electrical conductor 232 is wound between second outlet 216 and a position $P_2$ continuous electrical conductor 232 is wound between second outlet 216 and a position $P_3$, also in a poloidal geometry. Like position $P_2$, position $P_3$ may be any suitable means for securing the windings of continuous electrical conductor 232 at position $P_3$. In a most preferred embodiment, position $P_3$ is a silica quartz hook molded into the exterior 215 of wall 218 of reaction vessel 200 and positioned 15 cm from second outlet 216 wherein continuous electrical conductor 232 is wound between second outlet 216 and position $P_3$ approximately 18 windings.

After continuous electrical conductor 232 is wound between second outlet 216 and position $P_3$, continuous electrical conductor 232 is wound around first outlet 216 in a torroidal geometry. It is most preferred that contiguous electrical conductor 232 is wound around second outlet 216 approximately 80 windings.

Following the windings around second outlet 216, second end 236 of contiguous electrical conductor 232 extends from second outlet 216 to the negative post of the power supply (not shown). When power is supplied to contiguous electrical conductor 232 from the power supply, an electromagnetic field is generated within reaction vessel 200, and particularly between reaction chamber 217 and second end 219 so as to cause the $H_2^+$ and $O_2^-$ ions to migrate toward the respective first outlet 214 or second outlet 216. It should be understood that the manner in which contiguous electrical conductor 232 is wound, the number of windings, the spacing of the positions along reaction vessel 200 and the positive and negative magnetic fields can be modified and/or reversed as desired for a particular reaction vessel design or application.

As set out above, the inventive process utilizes light, electrical and microwave energies to generate hydrogen and oxygen from water. Typically, the water is in a vapor state. This vapor is irradiated with light emitted from mercury vapor lamps that emit UV radiation in the band wavelengths from 185 to 365 nm. The interior of the reaction vessel may or may not be coated with one or more transition metal oxides photo catalysts. This coating can act to contain the UV radiation inside the reaction vessel. Microwave energy is supplied by a RF wave emitter. The UV radiation and RF wavelengths will excite and heat the water molecules to the point of separation of hydrogen and oxygen.

For every two moles of water, the chemical reaction for splitting water molecules into their constituent elements of hydrogen and oxygen produces two moles of hydrogen and one mole of oxygen. This translates into 4 g of hydrogen and 32 g of oxygen for every 36 g of water. The initiation of this reaction requires the input of energy to drive the reaction. Breaking the water molecule is a two step process. The first step removes one proton while the section step breaks the OH radical into hydrogen and oxygen molecules.

Figure 5:
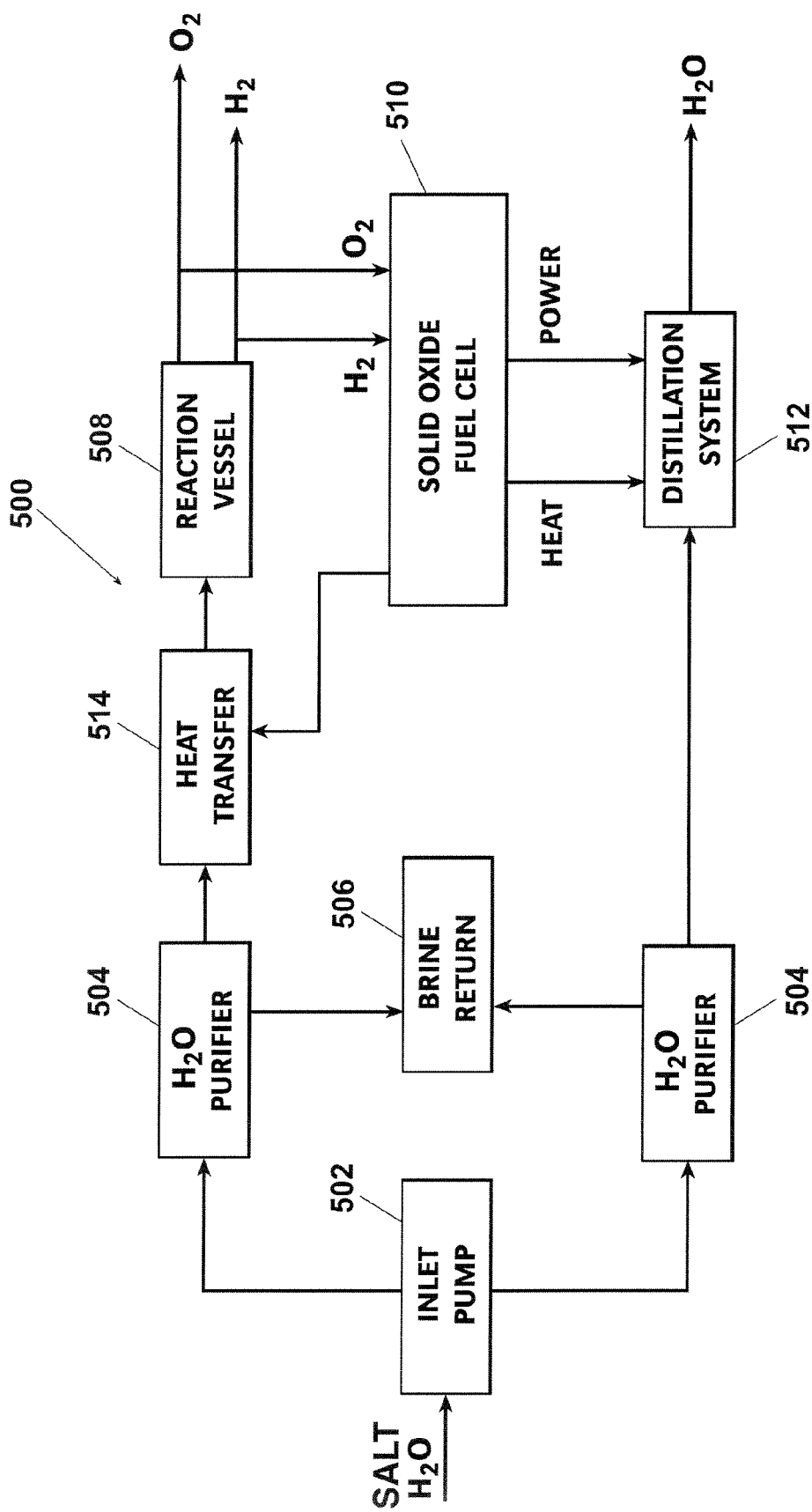
FIG. 5 depicts a simplified block/flow diagram of a water desalination and dissociation system employing an ultra fast dissociation method including the reaction vessel of the present disclosure.

FIG. 5 depicts a simplified block diagram of a dissociation system employing the method illustrated in FIG. 1A and FIG. 1B. The exemplary system illustrates a combined water desalination and water dissociation system 500 and includes an inlet pump 502, water purifiers 504, a distillation system 512, a heat source, such as solid oxide fuel cell 510, a heat exchanger 514, and a reaction vessel 508.

A solid oxide fuel cell may have an operating temperature of approximately 1700° F. Utilizing this heat by-product greatly improves the overall efficiency of its relationship the inventive disassociation system. By utilizing the captive oxygen produced by the disassociation system, the solid oxide fuel cell improves its overall electrical output. Moreover, by capturing the heat produced by the solid oxide fuel cell, the temperature of the water vapor can be increased thus requiring less energy for the splitting of water molecules.

As stated, FIG. 5 shows a simplified block diagram of an embodiment 500 of an seawater distillation system which utilizes the solid oxide fuel cell 510 in combination with the water disassociation system of the present invention. Inlet pump 502 draws in seawater from an exterior source. Seawater is then provided to at least one water purifiers, collectively 504. These purifiers remove brine and other contaminants. The brine is stored in a brine retention apparatus 506. One part of the purified water is provided to the reaction vessel 508 to undergo the splitting of its water molecules into separate hydrogen and oxygen molecules. The other part of the purified water is provided to a distillation apparatus 512 to undergo a distillation of salt therefrom. At least a part of the oxygen and/or hydrogen which is produced by the disassociation process set out above is provided to the solid oxide fuel cell 510. The solid oxide fuel cell 510 the produces heat and power to effectuate the distillation process. The result being potable water and separated oxygen and hydrogen from seawater.

In a specific embodiment, the described system 500 is a high capacity system operable to produce 20,000 moles/minute of $H_2$ fuel. In this embodiment, the inlet pump 502 is a high capacity pump operable to supply on the order of 10 million gallons of seawater per day, examples of which are available from the Liquid Handling Systems Corporation of Santa Ana, Calif. The water purifier 504 and distillation system 512 are reverse osmosis filtration systems operable to process 5 MGD permeate (50% recovery), such as units available from Koch Membrane Systems, Inc. of San Diego, Calif. The heat source 510 is a solid oxide fuel cells operable to generate approximately 250 kW of power, and operate at around 1700° F. Exemplary units are available from Siemens Westinghouse. The heat exchanger 514 is operable to produce the acidic water vapor at between 120-210° C. between 7-10 psi (0.5-0.7 bar); Tranter, Inc. of Wichita Falls, Tex. manufactures exemplary units. Those skilled in the art will appreciate that the present invention is not limited to a system of any particular scale, and systems of smaller or larger size may be constructed under alternative embodiments.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A reaction vessel, comprising:
    a vessel body having an inlet, a reaction chamber, a first outlet and a second outlet;
    said vessel body including a photolysis apparatus for emitting photon energy into said reaction chamber; a radiolysis apparatus for directing ionizing radiation into said reaction chamber; a positive magnetic field generated adjacent said first outlet for attracting negatively charged ions contained within said reaction chamber; and a negative magnetic field generated adjacent said second outlet for attracting positively charged ions contained within said reaction chamber.

2. The reaction vessel of claim 1 including a plurality of windings of a contiguous electrical conductor positioned adjacent each of said first outlet and said second outlet.

3. The reaction vessel of claim 2 wherein said windings of said contiguous electrical conductor are wound in a first direction adjacent said first outlet and said windings of said contiguous electrical conductor are wound in a second direction adjacent said second outlet such that said first direction is opposite said second direction.

4. The reaction vessel of claim 3 wherein said magnetic field is generated by applying a magnetic current through said electrical conductor.

5. The reaction vessel of claim 4 wherein the number of said plurality of said windings positioned adjacent said first outlet and said second outlet are sufficient to create a magnetic field sufficient to attract respective positively or negatively charged ions to said respective first outlet or said second outlet.

6. The reaction vessel of claim 5 wherein each of said first outlet and said second outlet are substantially circular in cross section.

7. The reaction vessel of claim 6 wherein a portion of said plurality of windings are wound toroidally around said each of said first outlet and said second outlet.

8. The reaction vessel of claim 7 wherein said portion of said toroidal windings is 80windings.

9. The reaction vessel of claim 6 wherein a portion of said plurality of windings extend from said first outlet to a position $N_1$ along the exterior of said vessel body and are wound poloidally between said first outlet and said position $N_1$.

10. The reaction vessel of claim 9 wherein said portion of said poloidal windings is 14.

11. The reaction vessel of claim 6 wherein a portion of said plurality of windings extend from said first outlet to a position $N_2$ along the exterior of said vessel body and are wound poloidally between said first outlet and said position $N_2$.

12. The reaction vessel of claim 11 wherein said portion of said poloidal windings is 17.

13. The reaction vessel of claim 6 wherein a portion of said plurality of windings extend from said first outlet to a position $N_3$ along the exterior of said vessel body and are wound poloidally between said first outlet and said position $N_3$.

14. The reaction vessel of claim 13 wherein said portion of said poloidal windings is 20.

15. The reaction vessel of claim 6 wherein a portion of said plurality of windings extend from said second outlet to a position $P_1$ along the exterior of said vessel body and are wound poloidally between said second outlet and said position $P_1$.

16. The reaction vessel of claim 15 wherein said portion of said poloidal windings is 14.

17. The reaction vessel of claim 6 wherein a portion of said plurality of windings extend from said second outlet to a position $P_2$ along the exterior of said vessel body and are wound poloidally between said second outlet and said position $P_2$.

18. The reaction vessel of claim 17 wherein said portion of said poloidal windings is 16.

19. The reaction vessel of claim 6 wherein a portion of said plurality of windings extend from said second outlet to a position $P_3$ along the exterior of said vessel body and are wound poloidally between said second outlet and said position $P_3$.

20. The reaction vessel of claim 19 wherein said portion of said poloidal windings is 18.

21. A reaction vessel, comprising:

a vessel body having an inlet, a reaction chamber, a first outlet and a second outlet;

said first outlet and said second outlet are substantially round in cross section;

said vessel body including a positive magnetic field generated adjacent said first outlet for attracting negatively charged ions produced within said reaction chamber and a negative magnetic field generated adjacent said second outlet for attracting positively charged ions produced within said reaction chamber;

a plurality of windings of a contiguous electrical conductor are wound in a first direction adjacent said first outlet and plurality of windings of a contiguous electrical conductor are wound in a second direction adjacent said second outlet such that said first direction is opposite said second direction a portion of said plurality of windings extend from said first outlet to a position $N_1$ along the exterior of said vessel body and are wound poloidally between said first outlet and said position $N_1$;

a portion of said plurality of windings extend from said first outlet to a position $N_2$ along the exterior of said vessel body and are wound poloidally between said first outlet and said position $N_2$;

a portion of said plurality of windings extend from said first outlet to a position $N_3$ along the exterior of said vessel body and are wound poloidally between said first outlet and said position $N_3$;

a portion of said plurality of windings are wound toroidally around said first outlet;

a portion of said plurality of windings extend from said second outlet to a position $P_1$ along the exterior of said vessel body and are wound poloidally between said second outlet and said position $P_1$;

a portion of said plurality of windings extend from said second outlet to a position $P_2$ along the exterior of said vessel body and are wound poloidally between said second outlet and said position $P_2$;

a portion of said plurality of windings extend from said second outlet to a position $P_3$ along the exterior of said vessel body and are wound poloidally between said second outlet and said position $P_3$;

a portion of said plurality of windings are wound toroidally around said second outlet.

* * * * *